US 6,680,918 B1

(12) United States Patent
Haley

(10) Patent No.: US 6,680,918 B1
(45) Date of Patent: Jan. 20, 2004

(54) INTRA-TRAIN COMMUNICATION NETWORK

(75) Inventor: John E. Haley, Burleson, TX (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/390,699

(22) Filed: Sep. 7, 1999

(51) Int. Cl.$^7$ .................................................. H04B 1/44
(52) U.S. Cl. ..................... 370/282; 370/432; 340/425.5; 455/500
(58) Field of Search ..................... 370/346, 432, 370/316, 312, 278, 282; 455/519, 500; 246/182 R, 122 R; 105/61; 701/20, 2, 35; 303/3; 340/425.5; 89/1, 815

(56) References Cited

U.S. PATENT DOCUMENTS

| 3,380,399 A | 4/1968 | Southard et al. ............ 105/61 |
| 3,384,032 A | 5/1968 | Ruff ......................... 105/61 |
| 4,181,943 A | 1/1980 | Mercer, Sr. et al. .......... 701/20 |
| 4,582,280 A | 4/1986 | Nichols et al. ........... 246/182 R |
| 4,652,057 A | 3/1987 | Engle et al. .................. 303/3 |
| 4,896,580 A | 1/1990 | Rudnicki ................... 89/1.815 |
| 5,364,047 A | 11/1994 | Petit et al. ............. 246/122 R |
| 5,511,232 A | 4/1996 | O'Dea et al. ............... 455/519 |
| 5,570,284 A | 10/1996 | Roselli et al. ................ 701/2 |
| 5,588,005 A | * 12/1996 | Ali et al. .................... 370/346 |
| 5,691,980 A | 11/1997 | Welles, II et al. .......... 370/316 |
| 5,786,998 A | 7/1998 | Neeson et al. ............... 701/35 |
| 5,950,967 A | 9/1999 | Montgomery ........... 246/182 R |

FOREIGN PATENT DOCUMENTS

EP 748 085 A1 12/1996

* cited by examiner

Primary Examiner—John Pezzlo
(74) Attorney, Agent, or Firm—Barnes & Thornburg

(57) ABSTRACT

An intra-train communication network comprising a plurality of transceiver units on individual vehicles of the train. A master unit initially transmits queries, including a first ID from a first group of ID's, to the slave units using a second ID from a second group of ID's, and subsequently transmits queries using the first ID from the first group. The slave units initially listens for queries using the second ID from the second group, responds using the second ID and subsequently listens for and responds using the first ID.

33 Claims, 2 Drawing Sheets

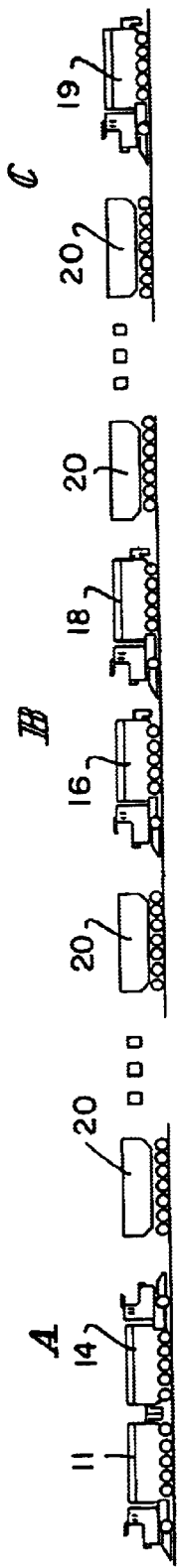
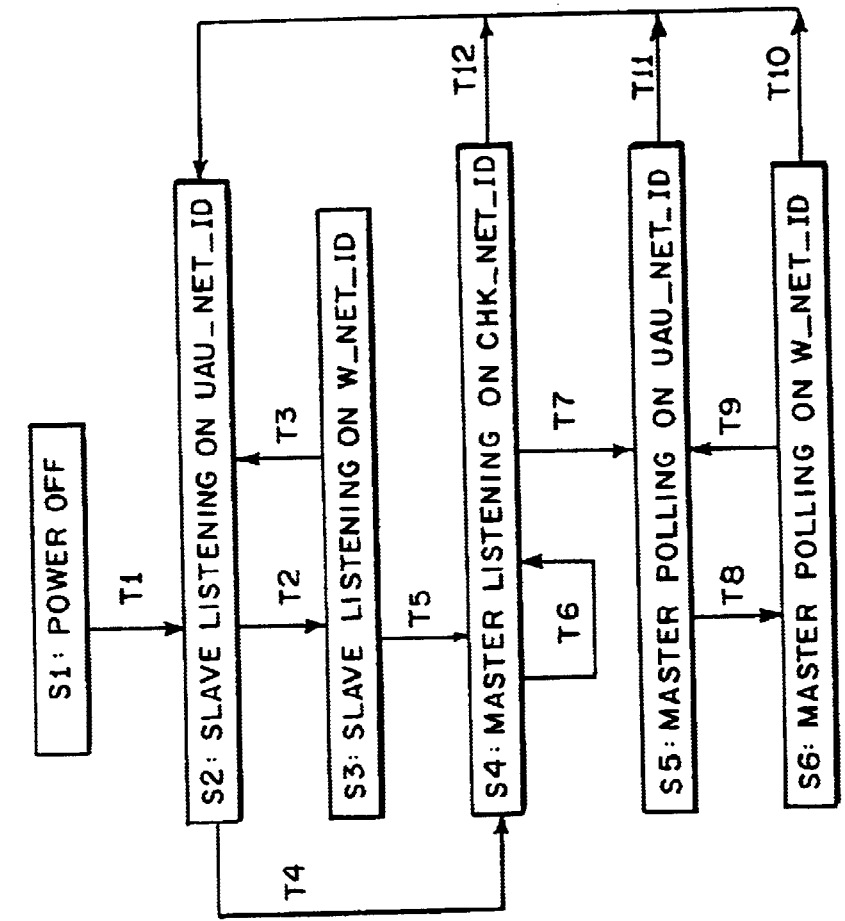
FIG. 1
FIG. 2

INTRA-TRAIN COMMUNICATION NETWORK

BACKGROUND AND SUMMARY OF THE INVENTION

The present invention relates generally to communication networks and more specifically to an intra-train communication network.

Intra-train communication using radio frequency signals allows each locomotive in a train to establish bidirectional data exchange. The locomotives may be at one end of the train in a consist or spread throughout the train. One challenge, in such an arrangement, is discerning locomotives in one train from those in another in order to distinguish data from each train. As the trains move across particular territories or terrains and are exposed to various levels of interferences, communication can be lost and must be re-established.

The present invention is an intra-train communication network including plurality of transceiver units on individual vehicles of a train. One of the transceiver units is a master unit transmitting queries or data request and the other units are slave units receiving the queries and transmitting responses. The master unit initially transmits queries which include a first ID from a first group of IDs to the slave unit using a second ID from a second set of IDs. Subsequently, the master unit transmits queries using the first ID from the first group.

The slave unit initially listens for queries using the second ID from the second group and responds using the second ID and then switches to the first ID from the first group in the query. Subsequently, the slave units listen for and respond using the first ID from the first group. A slave unit switches to listening for an available ID in the second group if the slave unit has not received a query within a first period of time. If the slave has not received a query from the master, it will alternate listening for the ID from the second group and for the ID from the first group.

The slave unit determines an available ID in the second unit as an ID in the second group which is in use no longer than a second period of time. The master unit determines the first ID for the first group as an ID in the first group which is not in use during a third period of time.

The master unit transmits to all slave units queries including the first ID and using the IDs of the second group if the master unit does not receive a response from any of the slave units in a fourth time period. Also, the master unit transmits to all slave units queries including the first ID and using the ID in the second group if the master unit does not receive a response from at least one of the slave units in the fourth time period and the speed of the train is zero. The master unit includes a list of all units in the network and only processes a response received from a unit in the list.

The master unit changes to a slave unit if the lead unit has requested to change from a master unit for a fifth period of time or the lead unit requests a change from a master unit and a slave unit has communicated over the network requested to become a master unit. During initialization all units are set to be slave units with an ID selected from the second group of IDs. When one unit is determined to be a master, it begins a process of selecting the first ID from the first group and communicating it to the slave units.

Other advantages and novel features of the present invention will become apparent from the following detailed description of the invention when considered in conjunction with the accompanying drawings.

BRIEF DESCRIPTION OF THE DRAWINGS

FIG. 1 is schematic view of a train which incorporates the intra-train communication network of the present invention.

FIG. 2 is a state diagram according to the principles of the present invention.

DETAILED DESCRIPTION OF THE PREFERRED EMBODIMENTS

Figure 3:
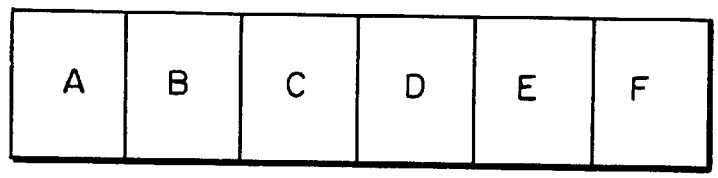
FIG. 3 is a diagram of a data request message according to the principles of the present invention.

As shown in FIG. 1, train 10 includes a plurality of locomotives 11, 14, 16, 18 and 19 in a train with a plurality of cars 20. Locomotive 11 and 14 form a consist A, locomotives 16 and 18 form a consist B and locomotive 19 forms a consist C. One of the locomotives is designated a lead locomotive and the others are considered trail and/or remote locomotives. In the industry, if locomotive 11 is the lead, locomotives 16 and 19 are remote and locomotives 14 and 18 are trail.

The lead locomotives communicates commands and controls to the remote locomotives. The lead and remote locomotives communicates commands and controls to their trail locomotives. Typically, the lead and remote locomotive communicate by radio while they communicate to their trail locomotives over a wire. The commands and controls may include, for example, setting the direction control, setting the throttle, set up dynamic braking, set up the operating modes, interlock dynamic brakes, as well as turning on and off various ancillary functions. The trail locomotives transmit status messages or exception message back to the lead locomotive. The status may include locomotive identification, operating mode and tractive-braking efforts. The exception message includes various faults such as wheels slip, locomotive alarm valve, incorrect brake pressure, low main reservoir pressure, throttle setting, etc.

Each of the locomotives includes a transceiver to transmit and receive messages. While the preferred embodiment will be described with respect to radio frequency communication between the locomotives or at least between the locomotive consists, if not between all locomotives, the same principles can be applied to communication along a wire where multiple communications may be taking place. Thus, for example, if there is a wire running throughout the train through locomotives 11, 14, 16, 18 and 19 and cars 20, and the locomotives form one network and the cars form another network, the same method may be used to allow private communication in either of the networks.

Also, preferably, the radio frequency transceiver is operated using a spread spectrum modulation technique. An example is the FreeWave® Spread Spectrum wireless data transceiver. As illustrated in FIG. 3, a data request message sent by a master unit includes a network ID at E, a slave unit address at C and D in a data packet. The address is the locomotive railroad ID at C and locomotive number at D of the specific slave unit transceiver's locomotive. The network ID is the network ID selected from the first group of working network IDs (W NET ID). The data request message is sent using the selected W NET ID or one from the second group of unassigned unit network IDs (UAU NET ID). The message also includes, for example, a message format number at A, format version number at B and check sum at F.

Figure 4:
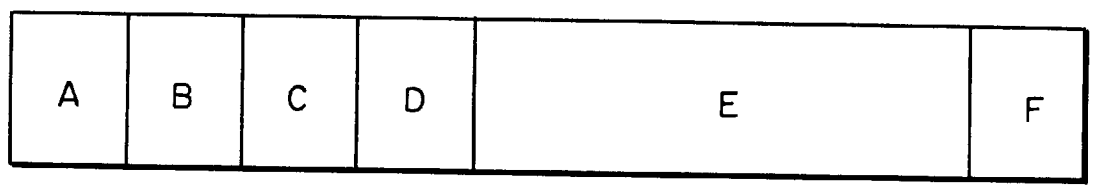
FIG. 4 is a diagram of a data response message according to the principles of the present invention.

Each of the transceivers is programmable to listen for a particular network ID and a data request message having its address. Once the slave unit receives the message having the network ID that it is listing for, and its address, it will provide a response message as illustrated in FIG. 4, for example. The response message would include its address, namely the locomotive railroad ID at C and locomotive unit number at D and the desired data at E. It also includes the message format number at A, the format version number at B and the check sum at F. The data required is that previously described as well as additional information or data.

The number of working network IDs is generally over 100 and the unassigned unit network IDs are generally less than 10. One example is using 1–250 for W NET IDs and 251–255 for UAU NET IDs.

The operation of the intra-train communication network will be discussed with respect to reference to FIG. 2 and Table 1.

TABLE 1

| Current State | Event or conditions | Transition | New state |
|---|---|---|---|
| S1 | Power on | T1 | S2 |
| S2 | In S2 for 50 seconds and received a query. | T2 | S3 |
| S3 | In S3 for 10 seconds and no query for self in last 6 minutes. | T3 | S2 |
| S2 | EQR on for 10 seconds. | T4 | S4 |
| S3 | EQR on for 10 seconds. | T5 | S4 |
| S4 | Carrier detected between 5 seconds and 50 seconds from start of S4. (Chk Net_Id updated to next available net id) | T6 | S5 |
| S4 | No carrier detected between 5 seconds and 50 seconds form start of S4. (W_Net_Id = Chk_Net_Id) | T7 | S5 |
| S5 | In S5 for 25 seconds | T8 | S6 |
| S6 | In S6 for 1 to 2 minutes and (No response from any slave unit for last 6 minutes) or (no Response from 1 or more slave units for last 6 minutes and speed is zero) | T9 | S5 |
| S6 | EQR off for 10 minutes or (EQR off and another lead unit has indicated it will become lead in 10 seconds or less) | T10 | S2 |
| S5 | EQR off for 10 minutes or (EQR off and another lead unit has indicated it will become lead in 10 seconds or less) | T11 | S2 |
| S4 | EQR off for 10 minutes or (EQR off and another lead unit has indicated it will become lead in 10 seconds or less) | T12 | S2 |

The initial state S1 is when the communication system is power off. When turning the power on, the transition T1 is to state 2 where all of the transponders are set into a slave mode and listen on an unassigned unit network ID UAU NET ID.

In state 2, each of the units determines an available unassigned unit ID by listening on a particular unassigned unit ID while timing the duration the particular UAU NET ID is in use. If it determines that a particular UAU NET ID is not being used for, for example, 30 seconds, then it will continue using that UAU NET ID. If the time period of the UAU NET ID was in continuous use exceeded 30 seconds, a new UAU NET ID is selected from the group of UAU NET IDs and tested.

One of the transceiving elements will become the master unit and changes its mode from slave to master. This master unit will transition T4 from state S2 to S4. An example for transition T4 relates specifically to the implementation on a locomotive intra-train communication network. One of the locomotives will become the lead or master and the other locomotives will become the trail or slaves. The lead locomotive in the train controls all of the other locomotives.

One of the ways of determining the lead locomotive and therefore the master transceiver is to monitor the state of the equalization reservoir which controls the brake pipe commands throughout the train. Only the lead locomotive will have its equalization reservoir active. In this example, the transition T4 takes place if the equalization reservoir is on for at least 10 seconds, for example.

In state S4, the master unit will now listen to the network to determine an available working network W NET ID from a second group of network IDs. The master unit will pick a network W NET ID and determine whether it has detected a message with that network ID between five seconds and 50 seconds from the start of state S4. If it does detect a carrier on the network with that network ID, it then moves on to another working network ID and starts over again in state S4 via transition T6. If it does not detect the candidate working network ID between five seconds and 50 seconds from the start of S4, it transitions T7 to state S5.

In state S5, the master unit polls the slave units on all of the unassigned unit net IDs to attempt to set up a communication. It does this since it does not know what UAU NET IDs each of the slaves have selected for themselves. The polling includes sending a message which includes the working net ID that it has selected in state S4 as well as the addresses of the individual units. The master unit includes a list of all locomotive IDs within its train and therefore each will only respond to messages received from a locomotive in the list.

The message being transmitted from the master unit to the slave units, using the UAU NET IDs, include specifically the WNET ID which has been selected. The addressed slave units upon hearing its address using its selected UAU NET ID responds using the UAU NET ID and switches to listening for and responds using the WNET ID transmitted in the query or data request from the master unit. When expiration of a given period of time, for example, 25 seconds in state S5, the master units transition T8 to state S6. In state S6, the master and slave unit communicate to each other continuously on the WNET ID.

The slave units, if they have been in state S2 listening on a selected UAU NET ID and receive a query during the master polling which is a state S5, transition T2 to state S3 to listening on the WNET ID received in the query from the master unit.

Communication may be interrupted in the network between the masters and slaves due to terrain or interference from the environment. If the slave unit has been in state S3, namely listening on the WNET ID for at least 10 seconds and does not receive a query for itself for at least six minutes, a transition T3 is back to S2. It determines an available UAU NET ID and alternately listens on the available UAU NET ID or the old WNET ID for a new query from the master unit. The alternating periods may be equal or unequal. For example, it will listen for 50 seconds for UAU NET ID and 10 seconds for WNET ID.

Similarly, there are two conditions in which the master unit will transition T9 from state S6 where it communicates using the selected WNET ID back to state S5 where it polls all of the slave units using the UAU IDs. One is if the master unit is in state S6 for at least one to two minutes and has not received a response from any slave units for the last six minutes, for example. This is an indication that communication has been lost with all of the slave units and the network must be re-initialized. This is generally while the train is in motion. Communication with a single slave unit will not cause re-initialization or transfer from state S6 to S5. While the train is moving, it is more important to maintain communication with whatever slave units communication can be maintained. Thus, information being transmitted back and forth will not be interrupted and effect control of the train.

A second condition which will cause a transition T9 from S6 to S5 if communication has been lost with at least one of the slave units for at least six minutes and the speed is zero. When the speed is zero, the train is not moving and therefore there is more time to re-establish communication with all of the units. Also, lack of communication will not effect safety. The six minute time period for lost communication is a function of the number of UAU NET ID's which are unavailable for use. For example, 50 to 60 seconds for each UAU NET ID.

Re-initialization of the system, namely going back to state S2, can be produced also when the lead or master locomotive is changed. This is illustrated by transitions T10, T11 and T1 from states S6, S5 and S4, respectfully back to state S2.

As discussed above, the present method determines whether a locomotive is in lead or master by the state of its equalization reservoir. The transitions T10, T11 and T12 by the lead locomotive can occur for two conditions. One is, the equalization reservoir at the master unit has been off for a period of time, for example, 10 minutes. The other condition is, that the equalization reservoir is off and another lead locomotive has indicated that it wants to be a lead locomotive and will transition to state S4 in 10 seconds or less.

Lead mode flag is conditioned by changes of equalization reservoir detection switch and data from slaves which contain status of their equalization reservoir detection switches. A slave will delay 10 seconds before declaring master and a master will continue as master up to 10 minutes if no slave has declared transition to master.

Other indicia may be used to determine a master unit. If the communication network does not correlate master and slave transceivers to lead and trail locomotives, any indicia may be used to indicate master versus slave.

In the specific embodiment described, the communication network consists of a reconfigurable radio in the lead locomotive acting as a master which polls any trailing and remote locomotives for status information. The master already knows the locomotive IDs of itself and the other locomotives in its train. Communication is established and re-established if lost, among the locomotives given a definition of the train consist, including unique locomotive numbers. Conflict resolution is provided if more than one machine is trying to use the same network ID or more than one locomotive claims to be the lead. Automatic detection of the locomotive lead status and redesignation of the master unit to coincide with change in lead is also provided. The software to establish the communication may be part of the transponder or any other interface with the locomotive controls. One typical example is the LEADER System, available from New York Air Brake Corporation.

Although the present invention has been described and illustrated in detail, it is to be clearly understood that the same is by way of illustration and example only, and is not to be taken by way of limitation. The scope of the present invention are to be limited only by the terms of the appended claims.

What is claimed:

1. A method of communicating between a master unit and one or more slave units in a network, the method comprising:

transmitting, from the master unit to a slave unit, queries using a first network ID of a first group of network ID's;

transmitting, from the slave unit to the master unit, a response using the first network ID if the slave unit is listening for the first network ID;

transmitting, from the master unit to an addressed slave unit, a query, which includes identification of the first network ID in a data portion of the query, using a second network ID of a second group of network ID's if the master unit does not receive the response to the queries using the first network ID from the slave unit in a first time period; and transmitting, from the addressed slave unit to the master unit, a response to the query which included the first network ID in the data portion of the query using the second network ID and then changing to listening for and transmitting using the first network ID.

2. A method according to claim 1, including switching a slave unit to listen for an available network ID in the second group if the slave unit has not received a query within a second time period.

3. A method according to claim 2, wherein the first and second periods are approximately 6 minutes depending upon the number of IDs in the second group.

4. A method according to claim 2, including determining an available network ID in the second group for the slave unit for listening as a network ID in the second group which is in use as a network ID for no longer than a third time period.

5. A method according to claim 2, wherein the slave unit is alternately switched to listening for an available network ID in the second group and for the first network ID of the first group if the slave unit has not received a query within the second time period.

6. A method according to claim 1, including switching a slave unit to listen for an available network ID in the second group upon initialization.

7. A method according to claim 1, wherein the first group has at least 100 ID's and the second group has no more than 10 ID's.

8. A method according to claim 1, including determining the first network ID of the first group as an ID in the first group which is not in use as a network ID during a fourth period of time.

9. A method according to claim 8, wherein the fourth period of time is in the range of 5 to 50 seconds.

10. A method according to claim 1, including storing in the master unit a list of all units in the network, and only processing responses received from a unit in the list.

11. A method according to claim 1, including changing the master unit to a slave unit (a) if the master unit has detected its change as a master unit may be needed for a fifth period or (b) if the master unit has pending a change as a master unit and one of the slave units has communicated over the network a query to become a new master unit.

12. A method according to claim 1, including transmitting, from the master unit to all the slave units, the query, which includes identification of the first network ID in the data portion of the query, using network ID's of the second group if the master unit does not receive a response to the queries using the first network ID from any of the slave units in the first time period.

13. A method according to claim 1, including transmitting, from the master unit to all the slave units, the query, which includes identification of the first network ID in the data portion of the query, using network ID's of the second group if them master unit does not receive the response to the queries using the first network ID from at least one of the slave units in a first time period and a speed of the train is zero.

14. A method of initializing a communicating network including a plurality of units, the method comprising:
setting each unit to listen for a network ID of a first group of network ID's as a slave unit;
selecting one of the units as a master unit;
determining an available second network ID of a second group of network ID's;
transmitting, from the master unit to all slave units using at least one network ID from the first group, a message including the second network ID in a data portion of the message; and
resetting each unit to listen for and communicate using the second network ID of the second group.

15. A method according to claim 14, wherein the network is on a train, and selecting the master unit includes determining an active state of an equalization reservoir on a vehicle in the train.

16. A method according to claim 14, including changing the master unit to a slave unit in the network (a) if the master unit has detected its change as a master unit for a fifth period or (b) if the master unit has pending a change as master unit and one of the slave units has communicated over the network a query to become a new master unit in the network.

17. A method according to claim 14, wherein determining the available second network ID includes determining a network ID in the second group which is not in use as the network ID during a first period of time.

18. A method according to claim 14, including determining an available network ID in the first group for the slave unit as network ID in the first group which is in use as the network ID for no longer than a second time period.

19. A method according to claim 14, wherein each slave unit determines its own available network ID from the first group of network ID's, and the master unit transmits, to all slave units using all the network ID's from the first group, a message including the second network ID in the data portion of the message.

20. A method according to claim 14, including determining if a new master unit has been selected in the network and if so, repeating the initialization process.

21. A method according to claim 14, including re-transmitting, from the master unit to all the slave units using network ID's of the first group, a message including the second network ID if the master unit does not receive a message from any of the slave units in a first time period.

22. A method according to claim 14, wherein the network is on a train, and re-transmitting, from the master unit to all the slave units using network ID's of the first group, a message including the second network ID if the master unit does not receive a message from at least one of the slave units in a first time period and a speed of the train is zero.

23. An intra-train communication network comprising:
a plurality of transceiver units on individual vehicles of the train;
one of the units being a master unit transmitting queries and the other units being slave units receiving the queries and transmitting responses;
the master unit initially transmitting a query, including a first network ID from a first group of network ID's in a data portion of the query, to the slave units using a second network ID from a second group of network ID's, and subsequently transmitting queries using the first network ID from the first group of network ID's; and
the slave units initially listening for the query using the second network ID from the second group, responding using the second network ID, and subsequently listening for queries and responding using the first network ID.

24. A network according to claim 23, wherein a slave unit switches to listen for an available network ID in the second group if the slave unit has not received the query within a first time period.

25. A network according to claim 24, wherein the slave unit determines an available network ID in the second group as a network ID in the second group which is in use as the network ID for no longer than a second time period.

26. A network according to claim 24, wherein the slave unit is alternately switched to listening for an available network ID in the second group and the first network ID of the first group if the slave unit has not received a query within the second time period.

27. A network according to claim 23, wherein the master unit transmits, to all the slave units, a query including the first network ID in the data portion of the query and using network ID's of the second group if the master unit does not receive a response from any of the slave units in a third time period.

28. A network according to claim 23, wherein the master unit transmits to all the slave units, a query including the first network ID in the data portion of the query and using network ID's of the second group if the master unit does not receive a response from at least one of the slave units in a third time period and a speed of the train is zero.

29. A network according to claim 23, wherein the master unit is on a vehicle in the train whose equalization reservoir is active.

30. A network according to claim 23, wherein the master unit switches to a slave unit if the master unit's vehicle's equalization reservoir is inactive for a fourth period or if the reservoir is inactive and a slave unit has communicated over the network a query to become a new master unit.

31. A network according to claim 23, wherein the master unit switches to a slave unit if the master unit's vehicle's equalization reservoir is inactive and a slave unit has communicated over the network a query to become a new master unit.

32. A network according to claim 23, wherein the master unit determines the first network ID of the first group as a network ID in the first group which is not in use as the network ID during a fifth time period.

33. A method of communicating between a master unit and one or more slave units in a network on a train, the method comprising:
initially transmitting, from the master unit to the slave units, a query, which includes a first network ID from a first group of network ID's in a data portion of the query, using a second network ID from a second group of network ID's, and subsequently transmitting queries using the first network ID from the first group; and
the slave units initially listening for the query using the second network ID from the second group, responding using the second network ID and subsequently listening for queries and responding using the first network ID.

* * * * *